No. 786,870. PATENTED APR. 11, 1905.
I. F. BROWN.
NECK YOKE AND POLE COUPLING.
APPLICATION FILED MAY 23, 1904.
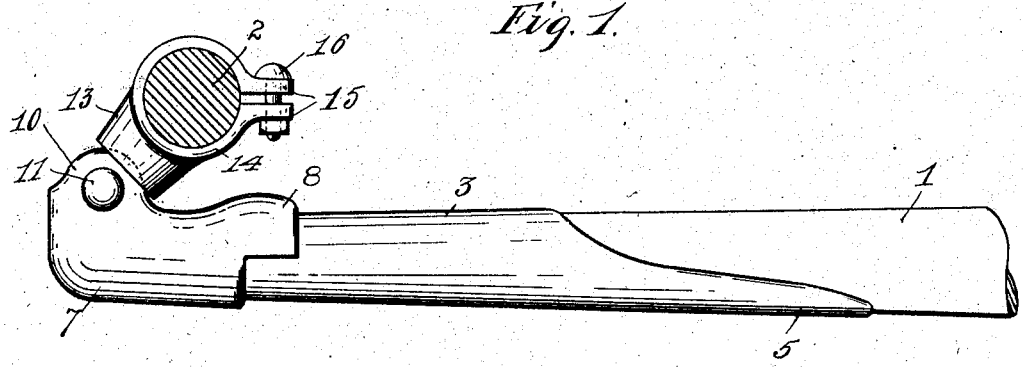
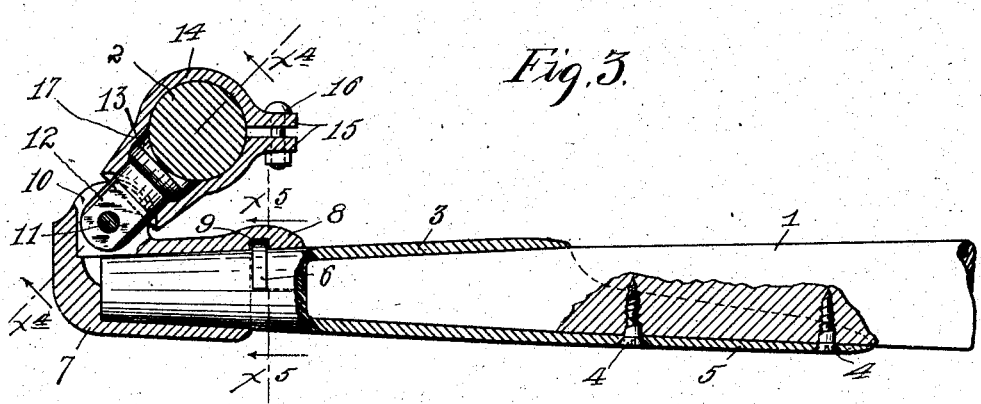
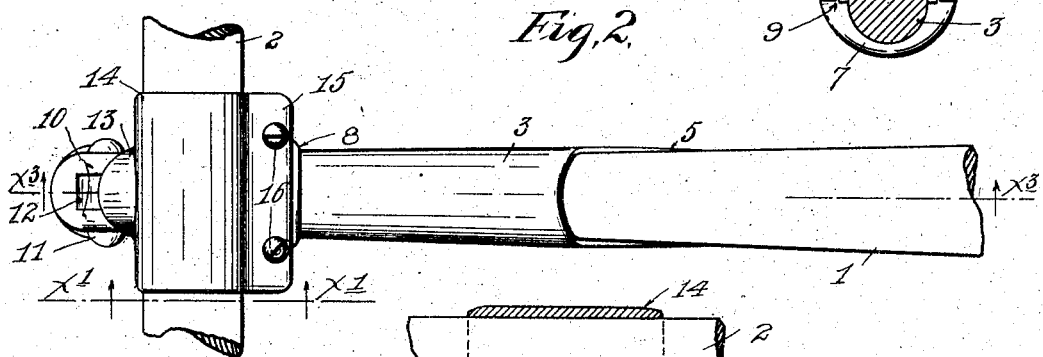
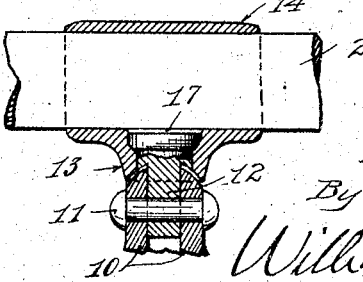
Witnesses.
H. D. Kilgore
E. W. Jepperson
Inventor:
Idaho F. Brown.
By his Attorneys,
Williamson & Merchant No. 786,870.

Patented April 11, 1905.

UNITED STATES PATENT OFFICE.

IDAHO F. BROWN, OF LITCHFIELD, MINNESOTA.

NECK-YOKE AND POLE COUPLING.

SPECIFICATION forming part of Letters Patent No. 786,870, dated April 11, 1905.

Application filed May 23, 1904. Serial No. 209,160.

*To all whom it may concern:*

Be it known that I, IDAHO F. BROWN, a citizen of the United States, residing at Litchfield, in the county of Meeker and State of Minnesota, have invented certain new and useful Improvements in Neck-Yoke and Pole Couplings; and I do hereby declare the following to be a full, clear, and exact description of the invention, such as will enable others skilled in the art to which it appertains to make and use the same.

My invention has for its object to provide an improved neck-yoke and pole coupling; and to such ends it consists of the novel devices and combinations of devices hereinafter described, and defined in the claims.

The invention is illustrated in the accompanying drawings, wherein like characters indicate like parts throughout the several views.

Figure 1 is a view principally in side elevation, but with some parts sectioned, on the line $x'$ $x'$ of Fig. 2, showing my improved coupling applied to connect a neck-yoke to a pole. Fig. 2 is a plan view of the parts shown in Fig. 1. Fig. 3 is a vertical section on the line $x^3$ $x^3$ of Fig. 2, some parts being left in full. Fig. 4 is a transverse section on the line $x^4$ $x^4$ of Fig. 3, and Fig. 5 is a transverse vertical section on the line $x^5$ $x^5$ of Fig. 3.

The numeral 1 indicates a wagon pole or tongue, and the numeral 2 indicates a neck-yoke, parts of the said pole and neck-yoke being broken away. A pole-cap 3 telescopes over the free end of the pole 1 and, as shown, is rigidly secured thereto by screws 4, passed through a rearwardly-projecting flange 5 of the said cap and screwed into the said pole. This pole-cap may, however, be secured in a great many different ways. In adapting the pole-cap 3 for the application thereto of my improved coupling it is formed with a segmental lock-flange 6, which is preferably located on the upper portion thereof and extends circumferentially through approximately one hundred and eighty degrees, as best shown in Figs. 3 and 5.

A so-called "pole-socket" 7 is loosely swiveled on the end of the pole-cap 3 and is provided with a segmental flange 8, that extends from the rear upper portion thereof throughout a little less than one hundred and eighty degrees. This flange 8 is formed with a segmental lock-groove 9, which is adapted to receive the lock-flange 6 of the pole-cap 3 when the said pole-socket 7 is turned into an operative position, as illustrated in the drawings. At the upper outer end portion the pole-socket 7 is bifurcated or formed with ears 10, to which is pivoted by a pin 11 a short trunnion 12, which is headed at its outer end. A so-called "yoke-socket" 13 is swiveled on the headed end of the pivoted trunnion 12 and is formed with approximately semicylindrical clamping-flanges 14, that embrace and clamp the central portion of the neck-yoke 2. The clamping-flanges 14 terminate in parallel ribs 15, through which short nutted bolts 16 are passed to clamp the said flanges 14 onto the yoke 2. The seat 17, which is formed in the socket 13 to receive the head of the trunnion 12, opens into the neck-yoke seat formed within the clamping-flanges 14. Hence when the neck-yoke is withdrawn from between the clamping-flanges 14 and the pivot pin or bolt 11 is removed from working position the said trunnion 12 may be removed from its seat within the socket 13 or may be placed in working position therein.

With the above-described coupling device it is evident that the neck-yoke is permitted a substantially universal movement in all directions. One movement is permitted by the rotation or oscillation of the pole-socket 7 on the pole-cap 3, another movement is permitted by the oscillation of the trunnion 12 on the pivot-bolt 11, and still another movement is permitted by the oscillation of the yoke-socket 13 on the said trunnion 12.

It is of course evident that the pole-socket 7 will remain locked with the pole-cap 3 under all movements which may be possibly given thereto while the neck-yoke is attached to the harness. When, however, the neck-yoke is detached and the coupling is turned upside down, so as to throw the socket-flange 8 and its segmental groove 9 entirely below the lock-flange 6 of the pole-cap 3, it is evident that the said pole-socket, together with the parts attached thereto, may be drawn forward off from the pole-cap, thus entirely disconnecting the coupling from the pole. It is also important to note that the detachable pole-socket 7 covers the extreme forward end of the pole-cap, so that the reins cannot catch on the latter, and, furthermore, that the said socket itself has no forwardly-projecting portions upon which the reins may catch. It is also important to note that the coupling above described will hold the neck-yoke attached to the pole even if one or more of the traces should become unhooked or broken. This, as is obvious, is an important feature in itself and will eliminate one of the frequent causes of serious accidents.

The coupling described may be constructed of any suitable metal; but the principal parts thereof will usually be in the form of malleable castings.

From what has been said it will be understood that the device described is capable of modification within the scope of my invention as herein set forth and claimed.

What I claim, and desire to secure by Letters Patent of the United States, is as follows:

The combination with the pole-cap 3, having the segmental lock-flange 6, of a pole-socket 7 covering and projecting beyond the end of said pole and having a segmental lock-groove 9 coöperating with said flange 6, to interlock said parts, a coupling-trunnion 12 pivoted to said socket 7 at 11 inward of the closed outer end of said socket, and a neck-yoke socket 13 swiveled to said trunnion 12, and provided with approximately semicylindrical clamping-flanges 14, adapted to embrace the neck-yoke, and means for clamping said flanges onto the neck-yoke, substantially as described.

In testimony whereof I affix my signature in presence of two witnesses.

IDAHO F. BROWN.

Witnesses:
R. C. MABEY,
F. D. MERCHANT.